(12) United States Patent
Rieser et al.

(10) Patent No.: US 7,543,475 B2
(45) Date of Patent: Jun. 9, 2009

(54) DEVICE FOR SIMULATING A SIDE COLLISION OF A MOTOR VEHICLE

(75) Inventors: Andreas Rieser, Zeltweg (AT); Arno Eichberger, Radegund (AT); Steffan Hermann, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 99 days.

(21) Appl. No.: 11/629,341

(22) PCT Filed: Jun. 9, 2005

(86) PCT No.: PCT/AT2005/000208

§ 371 (c)(1),
(2), (4) Date: Feb. 28, 2007

(87) PCT Pub. No.: WO2005/121742

PCT Pub. Date: Dec. 22, 2005

(65) Prior Publication Data

US 2007/0251295 A1 Nov. 1, 2007

(30) Foreign Application Priority Data

Jun. 9, 2004 (AT) ............................. GM406/2004

(51) Int. Cl.
*G01M 7/08* (2006.01)
*G01M 19/00* (2006.01)
(52) U.S. Cl. .................... 73/12.07; 73/12.04; 73/12.09; 73/865.3
(58) Field of Classification Search ................ 73/865.3, 73/12.07, 12.09, 12.01, 12.04
See application file for complete search history.

(56) References Cited

U.S. PATENT DOCUMENTS

| 5,483,845 | A | * | 1/1996 | Stein et al. ................. 73/865.3 |
| 5,485,758 | A | | 1/1996 | Brown et al. |
| 5,623,094 | A | * | 4/1997 | Song et al. ................. 73/12.07 |
| 5,872,321 | A | * | 2/1999 | Yannaccone ............... 73/865.3 |

(Continued)

FOREIGN PATENT DOCUMENTS

DE 198 54 856 12/2000

(Continued)

*Primary Examiner*—Harshad Patel
*Assistant Examiner*—Jonathan Dunlap
(74) *Attorney, Agent, or Firm*—Bachman & LaPointe, P.C.

(57) ABSTRACT

A device for simulating a collision of a motor vehicle by a laterally hitting impactor. The device comprises a seat carriage (3) which can be displaced in the transversal direction of the vehicle and on which a seat (5) is mounted, a lateral part carriage (10) on which a lateral part (13) of a motor vehicle body is mounted, and the impactor (20) that acts upon the lateral part (13) and is provided with an acceleration mechanism (21). The seat carriage (3) and the lateral part carriage (10) can be displaced independently of each other. In order to create a testing device which dispenses with the need for expensive and time-consuming preliminary tests to determine the settings for the tests, the impactor (20) is equipped with an acceleration mechanism (21) which can perform both positively and negatively accelerated movements in a controlled manner while an additional impactor (30) is provided that acts upon the seat carriage (3). In addition, further controls (15, 37) are provided for influencing the movement of the seat carriage (3).

17 Claims, 6 Drawing Sheets

U.S. PATENT DOCUMENTS

| | | | |
|---|---|---|---|
| 6,035,728 A * | 3/2000 | Jost | 73/865.3 |
| 6,561,007 B1 * | 5/2003 | Bock et al. | 73/12.01 |
| 6,675,631 B1 * | 1/2004 | Steffan et al. | 73/12.04 |
| 2005/0081656 A1 * | 4/2005 | Saari et al. | 73/865.3 |

FOREIGN PATENT DOCUMENTS

| | | |
|---|---|---|
| DE | 101 13 501 | 9/2002 |
| WO | WO 97/46859 | 12/1997 |
| WO | WO 99/30125 | 6/1999 |

* cited by examiner

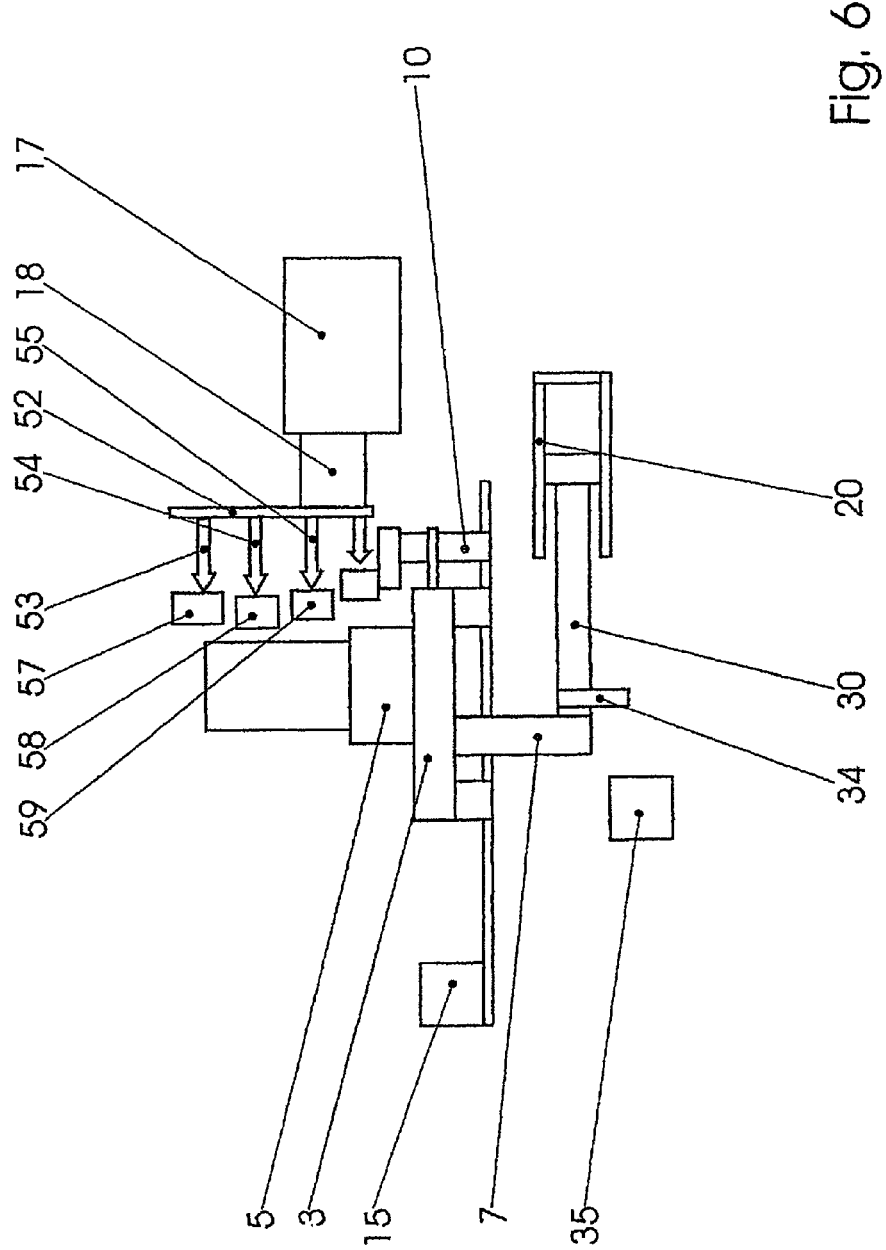

DEVICE FOR SIMULATING A SIDE COLLISION OF A MOTOR VEHICLE

BACKGROUND OF THE INVENTION

The invention relates to a device for simulating a collision of a motor vehicle with a laterally impacting impactor, composed of: a seat carriage which can be displaced in the transverse direction of the vehicle and on which a seat unit with an anthropomorphous crash test dummy and, if appropriate, various other components (for example safety devices) is mounted, a side component carriage which can be displaced in the transverse direction of the vehicle and on which a side component of the motor vehicle body, and if appropriate various other components, is mounted, and an impactor which is intended to act on the side component and which comprises an acceleration device, the seat carriage and the side component carriage being displaceable independently of one another.

When collisions occur in which a motor vehicle collides with one of its sides with a flat obstacle (also referred to as a barrier, for example the front part of another vehicle), the obstacle pushes a component of the side of the motor vehicle (a door or a side wall) into the passenger compartment of the vehicle where said component consequently pushes against the seat unit. The vehicle occupants therefore can be injured not only by the acceleration forces or inertia forces but also by the collision with the pressed-in motor vehicle side components. For this reason, test which are intended for testing the side components of the vehicle and the restraint systems which are provided for protecting the vehicle occupants (for example seat belts and side airbags) are prescribed. These tests are essentially crash tests with a barrier which represents another motor vehicle with which the test vehicle collides, and the subject of a series of regulations. Examples which may be mentioned are the following regulations or consumer safety tests: FMVSS214, EWG/EG 96/27, ECE-R95, US-LINCAP, EURO-NCAP, JAPAN-NCAP, IIHS side crash.

When developing vehicles, equivalent tests are frequently carried out in order to avoid the need to check the influence of certain structural changes by means of a crash test.

A device for carrying out such equivalent tests is known from U.S. Pat. No. 5,485,758. In said document, the seat carriage, side component carriage and the impactor are moveably guided in the transverse direction of the vehicle on an underlying surface which is provided with rails. In order to carry out a test, the impactor is firstly moved so far away from the test specimen, counter to the force of a spring, that the force of the spring which is stressed in the process corresponds to the acceleration which will give the collision speed to be simulated. Furthermore, the influences of all the components which are omitted from the test have to be taken into account for an informative test. For this purpose, acceleration profiles of the seat carriage and of the side component carriages are acquired either by means of a test with the entire vehicle or by calculation using the method of finite elements. In order to be able to reproduce these acceleration profiles, too, during the test, it is necessary for bodies which consume energy, have a damping or braking effect or shatter at a defined force to be mounted at various locations in numerous preliminary tests ("adjustment tests"), and said bodies are frequently successfully adjusted only by performing trials. During these very numerous tests, side components, doors, lining components, seat belts, airbags and seat units are destroyed, which makes these preliminary tests not only time-consuming but also very expensive.

An object of the invention is thus to provide a test device in which these preliminary tests can be dispensed with or can be at least drastically reduced.

SUMMARY OF THE INVENTION

According to the invention, a test device is distinguished by the fact that the impactor has an acceleration device which can carry out both positive and negative accelerations in a controllable fashion, that an additional impactor which acts on the seat carriage is provided, and that further control means for influencing the movement of the seat carriage are provided.

Since positive and negative accelerations can then be represented by actuating the acceleration device directly, without performing trials and mounting various bodies, the majority of these preliminary tests are already eliminated. The acceleration device preferably contains a piston to which a pressurized gas is applied in a controllable fashion, and a brake, and at the start of the test the impactor already bears against the side component. In this way, very abrupt acceleration changes in both directions can also be achieved. As a result, the impactor needs a shorter "run-up", and in the most favorable case it does not need one at all. The test system thus also needs less installation space and thus less space in the factory building.

In one embodiment, a start securing means and an end stop for the additional impactor are provided as control means for influencing the movement of the seat carriage (in addition to the energy which is to be supplied for a specific acceleration). In many cases, this relatively simple arrangement is sufficient. The start securing means is preferably a connection between the seat carriage and the side component carriage which is released when the side component carriage moves, and a connection to the underlying surface is not necessary. In particular, the connection can be a latch on one of the two carriages, which latch engages in a securing element, for example a longitudinally directed recess, in the other carriage, and is opened when the two carriages are made to approach. The latch is particularly easily spring-loaded in the opening direction. Likewise, the end stop for the additional impactor can act on the additional impactor, but permit further movement of the seat carriage.

In one particularly advantageous but somewhat more complex embodiment, in order to influence the movement of the seat carriage, the acceleration profile of the acceleration device of the additional impactor can be controlled in the range of positive accelerations and in the range of negative accelerations. As a result, the influences of all the components which are omitted during the test can largely be taken into account and the test results are particularly informative, especially if, as a development of the inventive idea, the acceleration device of the additional impactor also contains a piston to which a pressurized gas is applied in a controllable fashion. There is then also no need for stationary securement.

Finally, the scope of the invention also includes the fact that a number of actuators which can be actuated individually or at least in groups are provided on the door carriage. By means of said actuators it is possible to realistically represent different properties of the side components which are attached to individual mounting units (buckling B-pillar, various intrusion behaviors of the door and B-pillar).

BRIEF DESCRIPTION OF THE DRAWINGS

In the text which follows, the invention is described and explained with reference to figures, of which:

FIG. 6: is a schematic view of a developed device according to the invention.

DETAILED DESCRIPTION

Figure 1:
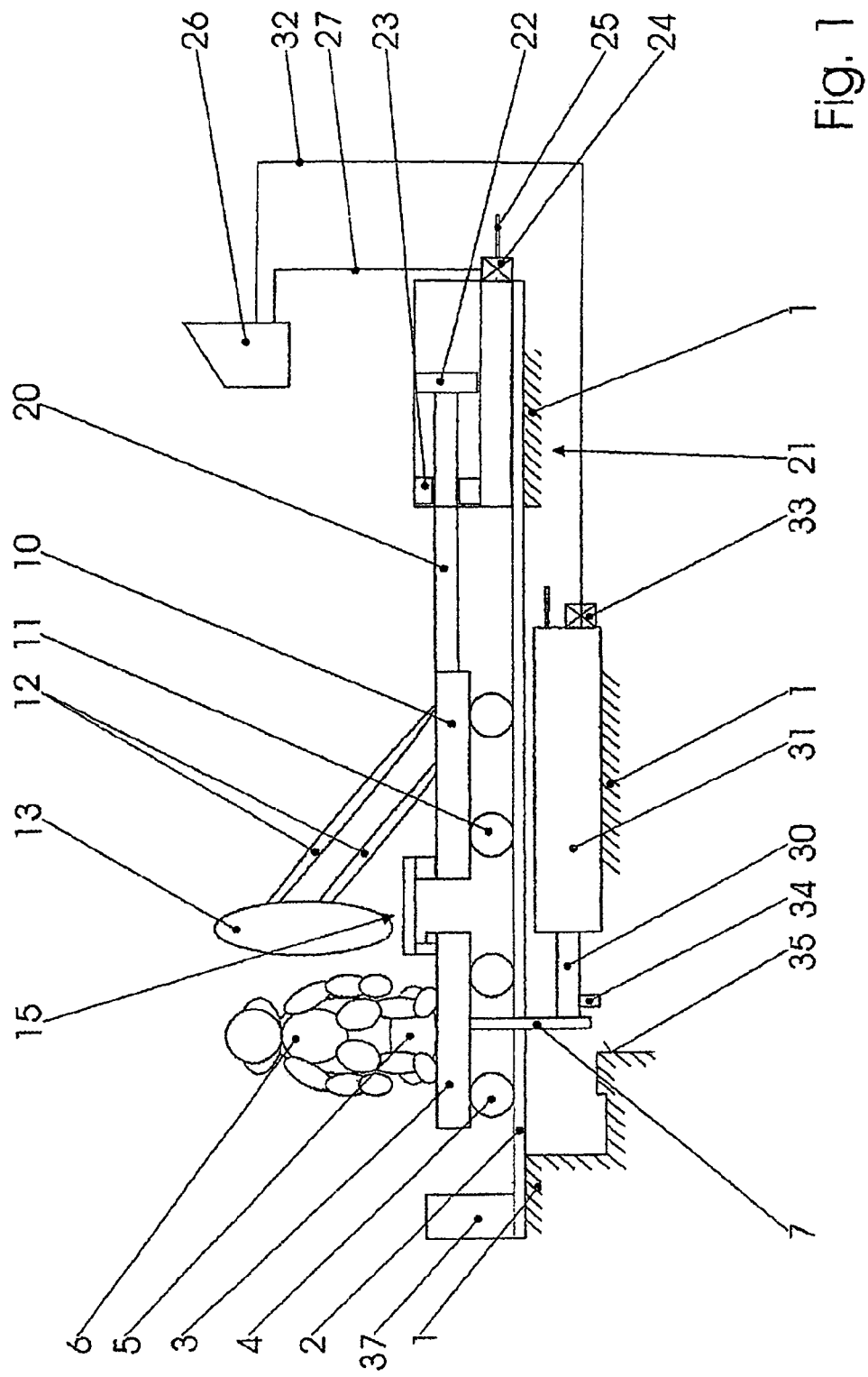
FIG. 1: is an outline of the device according to the invention in the initial position.

FIG. 1 shows the device according to the invention mounted as a fixed system on an underlying surface 1 (a base). Rails 2 for moving a seat carriage 3 and a side component carriage 10 are fixedly mounted on the underlying surface 1. The seat carriage 3 can be displaced by means of rollers 4 or sliding guides. A seat 5 for the motor vehicle to be examined and, if appropriate, various safety devices and finally an anthropomorphous crash test dummy 6 are placed on said seat carriage 3. Furthermore, a further force engagement point is provided on the seat carriage 3, said engagement point being symbolically an extension arm 7 which projects downwards.

Figure 2:
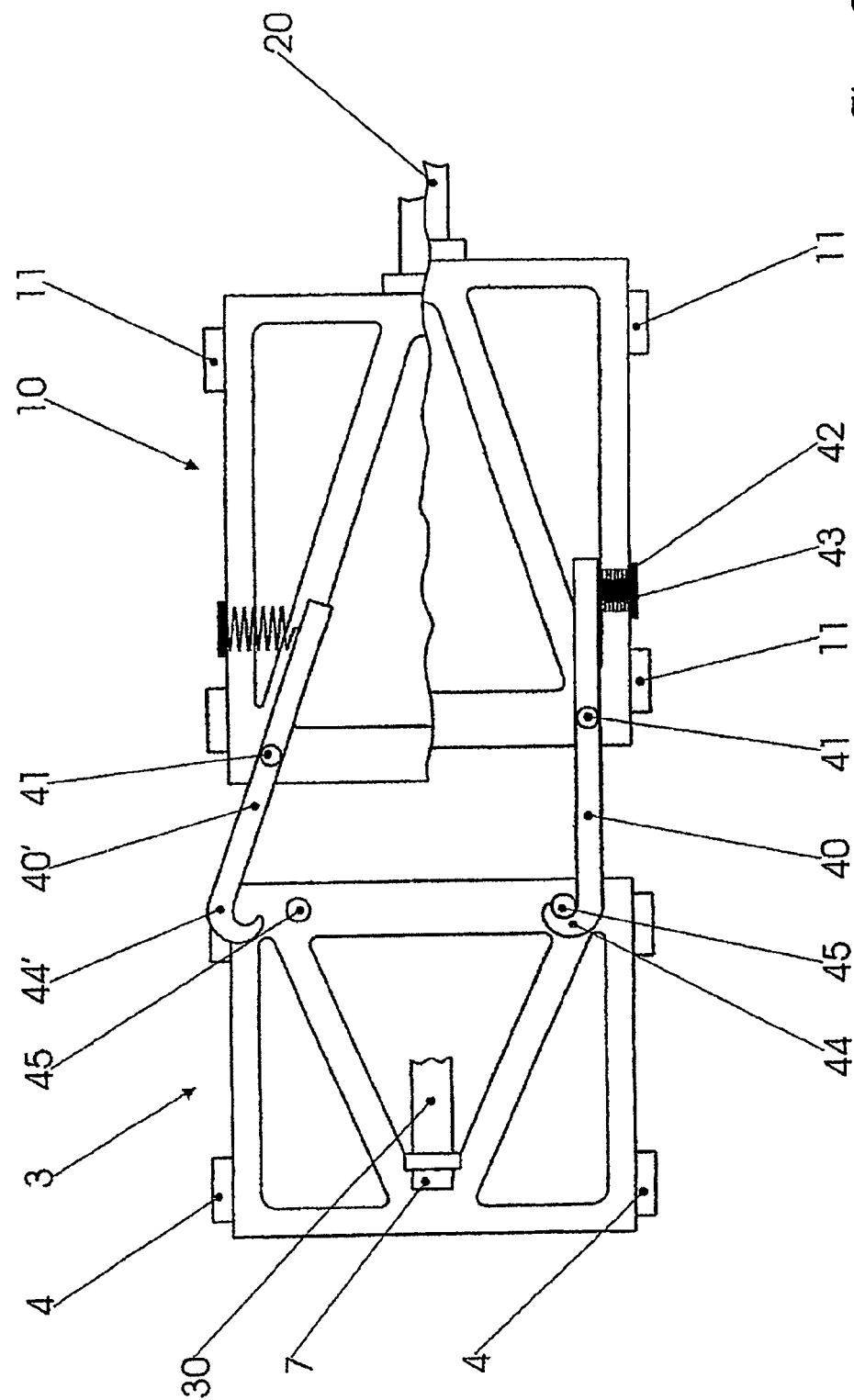
FIG. 2: shows a detail of FIG. 1, FIG. 3: shows the same as FIG. 1 at the start of the test.

The side component carriage 10 can likewise be displaced on the rails 2 by means of rollers 11 or sliding guides. The side component carriage 10 bears a clamping device 10 for a side component 13 or a door of a motor vehicle. A start securing means 15, which is described below with reference to FIG. 2, is provided between the side component carriage 10 and the seat carriage 3.

An impactor 20 bears against the side component carriage 10. The impactor 20 is part of an acceleration device 21 which can control positive and negative accelerations in a predefined time profile. For this purpose, it contains a piston 22 which is connected to the impactor 20, and a brake device 23 which acts on said piston 22. As a matter of fact, the acceleration device 21 is described per se in DE 199 27 944. The impactor 20 is controlled by means of energy which is fed via line 25, using a control valve 24 which is actuated by a control center 26 via a signal line 27. The control center 26 controls the test sequence and in particular the respectively defined, variable profile of the accelerations which are imparted to the impactors.

An additional impactor 30 is intended, as part of a fixed acceleration device 31, to act on the extension arm 7 of the seat carriage 3 and has a beard 34. The acceleration device 31 is advantageously similar to the acceleration device 21, but it can also be of a simpler design without the possibility of setting negative accelerations as well. The acceleration device 31 is also actuated by the control center 26 via a signal line 32 which acts on a valve 33.

An effect chain which acts from the impactor 20 to the seat carriage 3 via the side component carriage 20 is thus built up, and ends at a second stop 37 for the seat carriage 3. The additional impactor 30 opens into this effect chain at the seat carriage 3. The second stop 37 can be replaced, as an alternative, by a brake which is mounted on the seat carriage.

FIG. 2 is a schematic illustration of the start securing means 15 in a plan view, the lower half of the side component carriage 10 in the image being represented in the initial position, and its upper half being illustrated in a position which is displaced slightly forward. A two arm lever 40 is mounted on the side component carriage 10, at a pivot point 41. One of its arms is supported by means of a compression spring 42 at an abutment point 43 which is attached to the carriage. The other arm forms, at its end, a hook 44 which engages around a securing element 45, here a pin, thus preventing displacement of the seat carriage 3. If the side component carriage 10 is moved somewhat toward the seat carriage 3, the hook 44' is released from the pin 45 as a result of the effect of the compression spring 42, and the seat carriage 3 is released, the latter being able to move independently of the side component carriage 10 under the effect of the additional impactor 30. In reality, the movements of the two sided levers 40 are symmetrical. Furthermore, within the scope of the invention, the start securing means can also be embodied differently from the exemplary embodiment shown. All that is necessary is to ensure that the connection between the two carriages 3, 10 is released when the side component carriage 10 starts to move.

Figure 3:
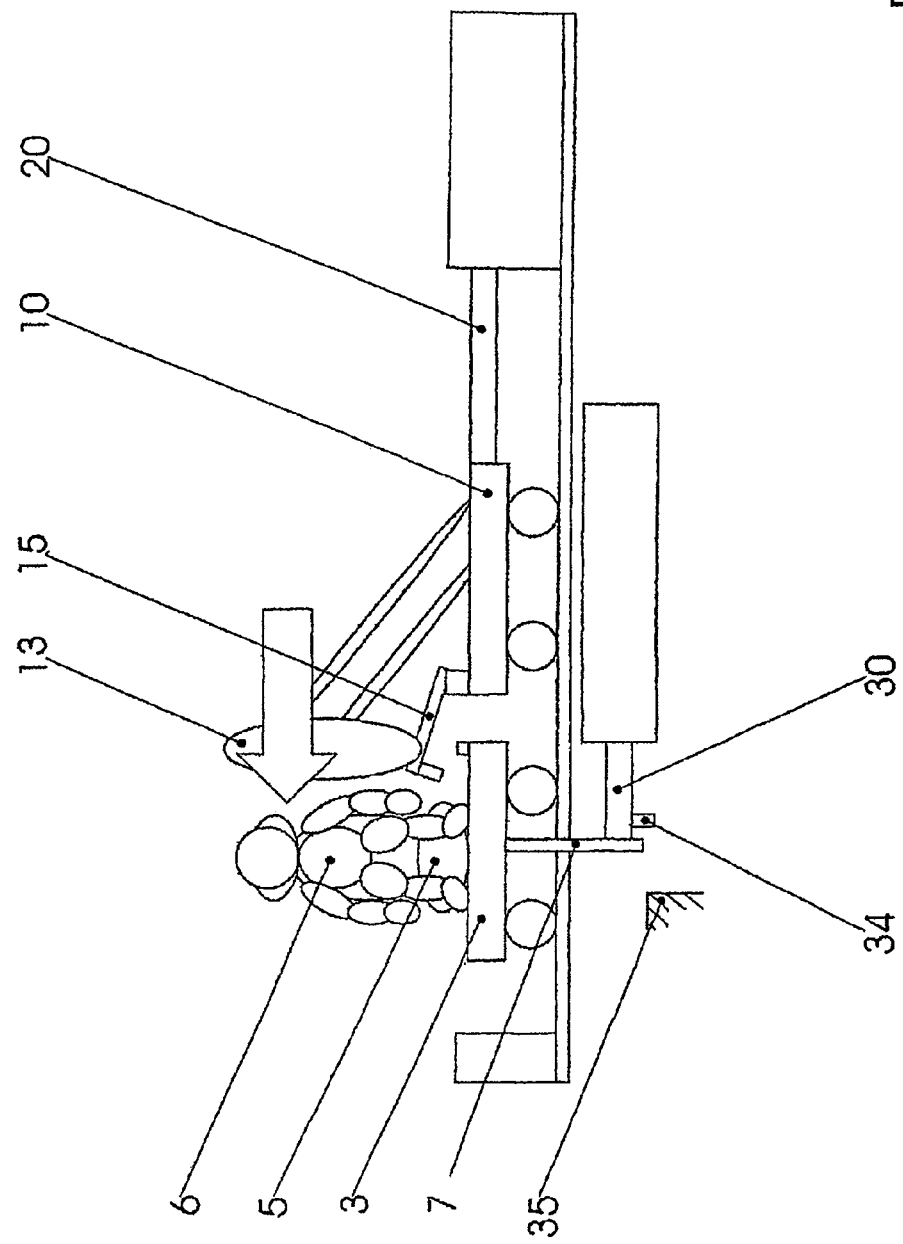
Figure 4:
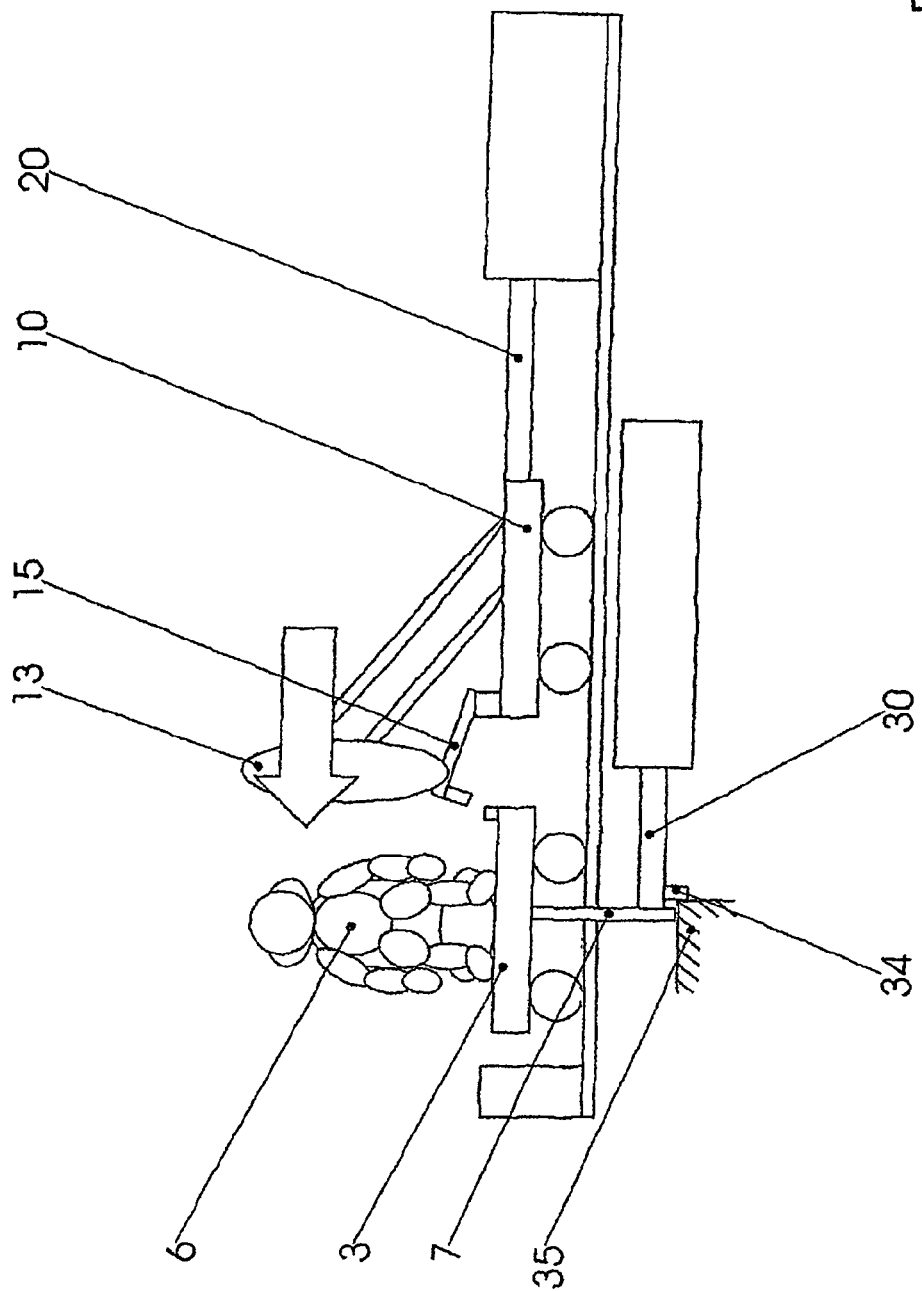
FIG. 4: shows the same as FIG. 1 in an intermediate stage of the test.
Figure 5:
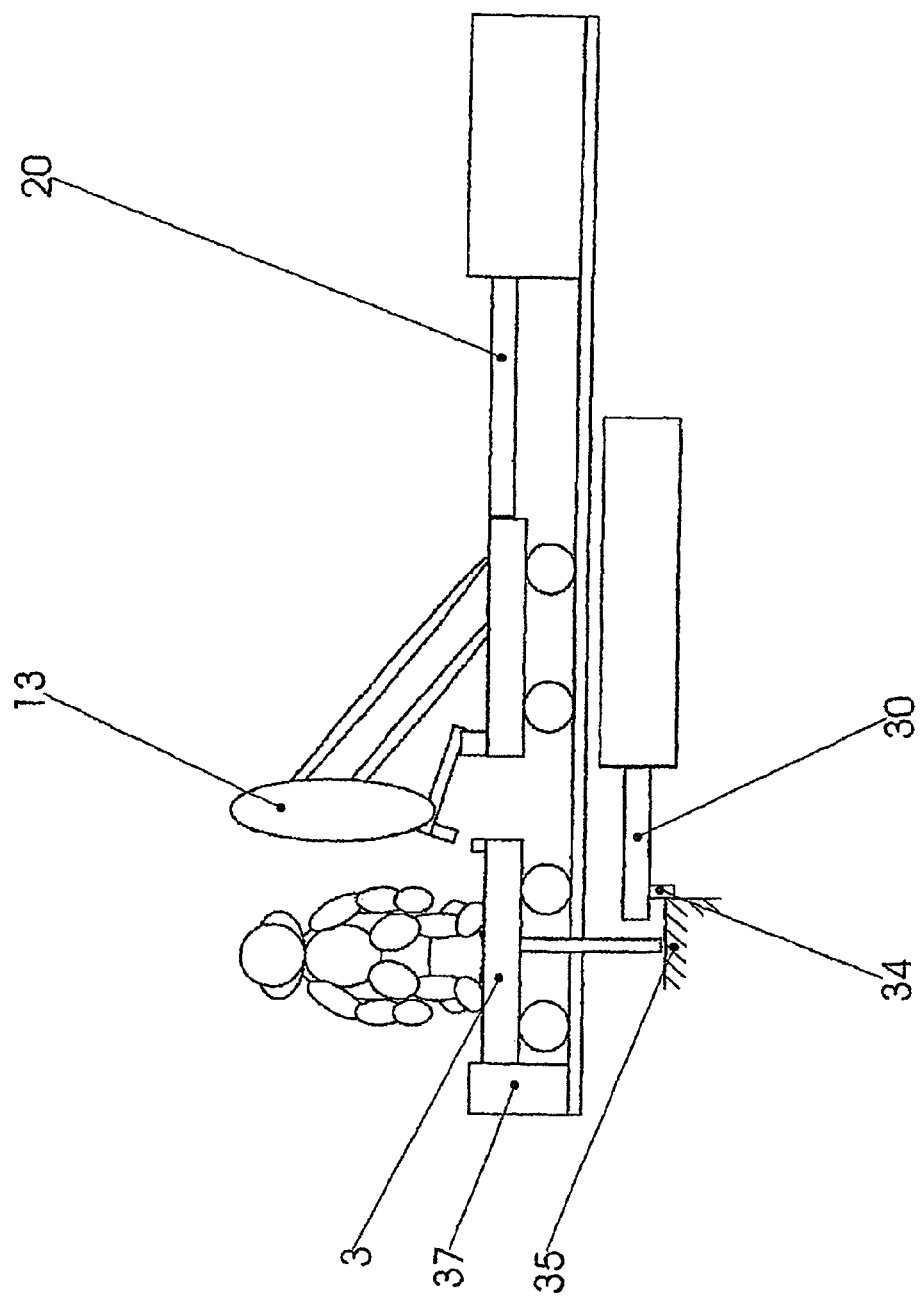
FIG. 5: shows the same as FIG. 1 at the end of the test.

The method of operation of the device described will be described below starting from the position of rest in FIG. 1. A certain acceleration profile, which can be positive or negative, is impressed on the impactor 20 by means of a start signal from the control center 26. This acceleration profile has previously been determined, as rule by means of calculations according to the method of finite elements, or from corresponding measurements in preceding crash test. As soon as the impactor 20, and with it the side component carriage 10 has began to move, the start securing means 15 is released and the side component 13 impacts against the seat 5 and/or the crash test dummy 6. Approximately at the same time, the precise time being predefined again by the control center 26, the additional impactor 30 is also set in motion. This is the situation illustrated in FIG. 3. FIG. 4 shows an intermediate position which is reached when the additional impactor 30 has covered a certain amount of travel, which is defined by a fixed stop 35 against which the additional impactor 30 strikes with its beard 34. From this moment, the seat carriage 3 is completely freely moveable; that is to say it moves according to its mass inertia until it comes to a standstill against the stop 37 or as a result of a brake which is mounted on the seat carriage. The test is thus ended. Various further measured values and the state of the crash test dummy as well as various further devices which are provided to protect it can now be evaluated.

Finally, FIG. 6 shows in very broad block outline a development of the invention. This differs from the previously described embodiment in that a clamping device 52 and a series of actuators 53, 54, 55, are provided, as it were as small impactors, in place of the side component 13 on the side component carriage 10, said actuators 53, 54, 55 having mounting units 57, 58, 59 for internal lining components which are intended to protect certain areas of the body. The actuators 53 to 55 and the mounting units 57, 58, 59 are also distributed over the surface of the clamping device 52 in a way corresponding to these body areas.

The invention claimed is:

1. A device for simulating a collision of a motor vehicle with a laterally impacting impactor, comprising:
   a) a seat carriage (3) which can be displaced in the transverse direction of the vehicle and on which a seat (5) is mounted,
   b) a side component carriage (10) which can be displaced in the transverse direction of the vehicle and on which a side component (13) of a motor vehicle body is mounted, and
   c) the impactor (20) which is intended to act on the side component (13) and comprises an acceleration device (21), the seat carriage (3) and the side component carriage (10) being displaceable independently of one another, wherein d) the impactor (20) has an acceleration device (21) which can carry out both positively and negatively accelerated movements in a controllable fashion, e) an additional impactor (30) which acts on the seat carriage (3) is provided, f) further control means (15, 37) are provided for accelerating the movement of the seat carriage (3), and g) a start securing means (15) and an end stop (35) for the additional impactor (30) are provided as control means for influencing the movement of the seat carriage (3).

2. The device as claimed in claim 1, wherein the acceleration device (21) contains a piston (22) to which a pressurized gas is applied in a controllable fashion, and brake devices (23), and at the start of the test the impactor (20) already bears against the side component (13).

3. The device as claimed in claim 1, wherein the start securing means (15) is a connection between the seat carriage (3) and the side component carriage (10) which is released when the side component carriage (10) moves.

4. The device as claimed in claim 3, wherein the connection is a latch (40, 44) on one of the two carriages (3; 10), which latch (40, 44) engages in a securing element (45) in the other carriage (10; 3) and is opened when the two carriages (3, 10) are made to approach.

5. The device as claimed in claim 4, wherein the latch (40, 44) is spring-loaded in the opening direction, and it is released when the two carriages (3, 10) are made to approach.

6. The device as claimed in claim 1, wherein the end stop (35) for the additional impactor (30) acts on the additional impactor (30) but permits the further movement of the seat carriage (3).

7. The device as claimed in claim 1, wherein, in order to influence the movement of the seat carriage (3), an acceleration profile of an acceleration device (31) of the additional impactor (30) can be controlled in the range of positive accelerations and in the range of negative accelerations.

8. The device as claimed in claim 1, wherein the acceleration device (31) of the additional impactor (30) contains a piston to which a pressurized gas is applied in a controllable fashion.

9. The device as claimed in claim 1, wherein a number of actuators (53-55) which can be actuated individually are provided on the side component carriage (10).

10. A device for simulating a collision of a motor vehicle with a laterally impacting impactor, comprising:

a) a seat carriage (3) which can be displaced in the transverse direction of the vehicle and on which a seat (5) is mounted, b) a side component carriage (10) which can be displaced in the transverse direction of the vehicle and on which a side component (13) of a motor vehicle body is mounted, and c) the impactor (20) which is intended to act on the side component (13) and comprises an acceleration device (21), the seat carriage (3) and the side component carriage (10) being displaceable independently of one another, wherein d) the impactor (20) has an acceleration device (21) which can carry out both positively and negatively accelerated movements in a controllable fashion, e) an additional impactor (30) which acts on the seat carriage (3) is provided, f) further control means (15, 37) are provided for accelerating the movement of the seat carriage (3), and g) a start securing means (15) and an end stop (35) for the additional impactor (30) are provided as control means for influencing the movement of the seat carriage (3), wherein the end stop (35) for the additional impactor (30) acts on the additional impactor (30) but permits the further movement of the seat carriage (3).

11. The device as claimed in claim 10, wherein the acceleration device (21) contains a piston (22) to which a pressurized gas is applied in a controllable fashion, and brake devices (23), and at the start of the test the impactor (20) already bears against the side component (13).

12. The device as claimed in claim 10, wherein the start securing means (15) is a connection between the seat carriage (3) and the side component carriage (10) which is released when the side component carriage (10) moves.

13. The device as claimed in claim 12, wherein the connection is a latch (40, 44) on one of the two carriages (3; 10), which latch (40, 44) engages in a securing element (45) in the other carriage (10; 3) and is opened when the two carriages (3, 10) are made to approach.

14. The device as claimed in claim 13, wherein the latch (40, 44) is spring-loaded in the opening direction, and it is released when the two carriages (3, 10) are made to approach.

15. The device as claimed in claim 10, wherein, in order to influence the movement of the seat carriage (3), an acceleration profile of an acceleration device (31) of the additional impactor (30) can be controlled in the range of positive accelerations and in the range of negative accelerations.

16. The device as claimed in claim 10, wherein the acceleration device (31) of the additional impactor (30) contains a piston to which a pressurized gas is applied in a controllable fashion.

17. The device as claimed in claim 10, wherein a number of actuators (53-55) which can be actuated individually are provided on the side component carriage (10).

* * * * *